(12) United States Patent
Truax

(10) Patent No.: US 9,071,484 B1
(45) Date of Patent: Jun. 30, 2015

(54) FEEDBACK OPTIMIZED VIDEO CODING PARAMETERS

(75) Inventor: Gregory K. Truax, Portland, OR (US)

(73) Assignee: Elemental Technologies, Inc., Portland, OR (US)

(*) Notice: Subject to any disclaimer, the term of this patent is extended or adjusted under 35 U.S.C. 154(b) by 716 days.

(21) Appl. No.: 13/323,007

(22) Filed: Dec. 12, 2011

Related U.S. Application Data

(60) Provisional application No. 61/471,879, filed on Apr. 5, 2011.

(51) Int. Cl.
| | |
|---|---|
| *H04N 7/12* | (2006.01) |
| *H04N 11/02* | (2006.01) |
| *H04N 11/04* | (2006.01) |
| *G06F 15/16* | (2006.01) |
| *H04L 29/06* | (2006.01) |
| *H04N 19/61* | (2014.01) |

(52) U.S. Cl.
CPC .......... *H04L 29/06027* (2013.01); *H04N 19/61* (2014.11)

(58) Field of Classification Search
USPC ................................................ 375/240.07
See application file for complete search history.

(56) References Cited

U.S. PATENT DOCUMENTS

| | | | |
|---|---|---|---|
| 5,500,673 A * | 3/1996 | Zhou .............................. 348/156 |
| 7,818,444 B2 | 10/2010 | Brueck et al. ................. 709/231 |
| 2008/0101466 A1* | 5/2008 | Swenson et al. ......... 375/240.07 |
| 2009/0270170 A1* | 10/2009 | Patton ............................ 463/36 |
| 2011/0069756 A1* | 3/2011 | Matthews ................ 375/240.12 |
| 2011/0268186 A1* | 11/2011 | Mukherjee et al. ...... 375/240.07 |
| 2013/0060911 A1* | 3/2013 | Nagaraj et al. ................ 709/219 |

* cited by examiner

*Primary Examiner* — Hee-Yong Kim
(74) *Attorney, Agent, or Firm* — Christopher P. Maiorana, PC

(57) ABSTRACT

A system for managing delivery of video content. The system includes a controller and one or more players. The controller may be configured to control generation of a plurality of streams containing the video content based upon feedback regarding decoding at least one of the plurality of streams. The one or more players may be configured to select a stream from the plurality of streams, generate decoding statistics for the selected stream, and send the decoding statistics to the controller as the feedback.

20 Claims, 3 Drawing Sheets

FEEDBACK OPTIMIZED VIDEO CODING PARAMETERS

This application claims the benefit of U.S. Provisional Application No. 61/471,879, filed Apr. 5, 2011, and is hereby incorporated by reference in its entirety.

FIELD OF THE INVENTION

The present invention relates to video distribution generally and, more particularly, to a method and/or architecture for feedback optimized video coding parameters.

BACKGROUND OF THE INVENTION

Content cached in a content delivery network or content distribution network (CDN) is generated by content providers. The content providers generate a fixed number of versions (or streams) of the content based on expected demand. Conventional content delivery solutions use an encoding device to produce several streams with a variety of predetermined encoding parameters simultaneously. The content delivery network delivers the content to an audience using the plurality of streams having the variety of encoding parameters. However, because the number of streams and variety of encoding parameters is fixed, the conventional solutions can fail to provide the audience with an optimal experience.

It would be desirable to have a system for delivering content that could provide an optimal experience to consumers of the content.

SUMMARY OF THE INVENTION

The present invention concerns a system for managing delivery of content. The system includes a controller and one or more players. The controller may be configured to control generation of a plurality of streams containing the content based upon feedback regarding decoding at least one of the plurality of streams. The one or more players may be configured to select a stream from the plurality of streams, generate decoding statistics for the selected stream, and send the decoding statistics to the controller as the feedback.

The objects, features and advantages of the present invention include providing a method and/or architecture for feedback optimized video coding parameters that may (i) adjust encoding parameters of one or more encoders based upon automated feedback, (ii) generate said automated feedback without user interaction (e.g., computer generated), (iii) generate a plurality of streams containing video content, (iv) maximize quality for a current audience, (v) maximize audience size for a given bandwidth allocation, (vi) maximize audience size for a given delivery cost, and/or (vii) minimize a number of streams needed for a given audience.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Adaptive bitrate content delivery solutions may use an encoding device to produce several streams with different encoding parameters simultaneously. In one example, the content delivery may comprise delivering content (e.g., video, audio, audio-video, etc.) to an audience using a plurality of streams (e.g., video streams, audio streams, audio-video streams, etc.) having a variety of encoding parameters. In one example, the encoding parameters may be created by an operator (or content provider) in advance of producing a live event or a set of Video On Demand (VOD) files for adaptive bitrate distribution to consumers (e.g., viewers, listeners, etc.). In an example embodiment, the present invention generally provides a method and/or apparatus for automatically configuring encoding parameters based on real-time feedback from client (decoder) devices.

Figure 1:
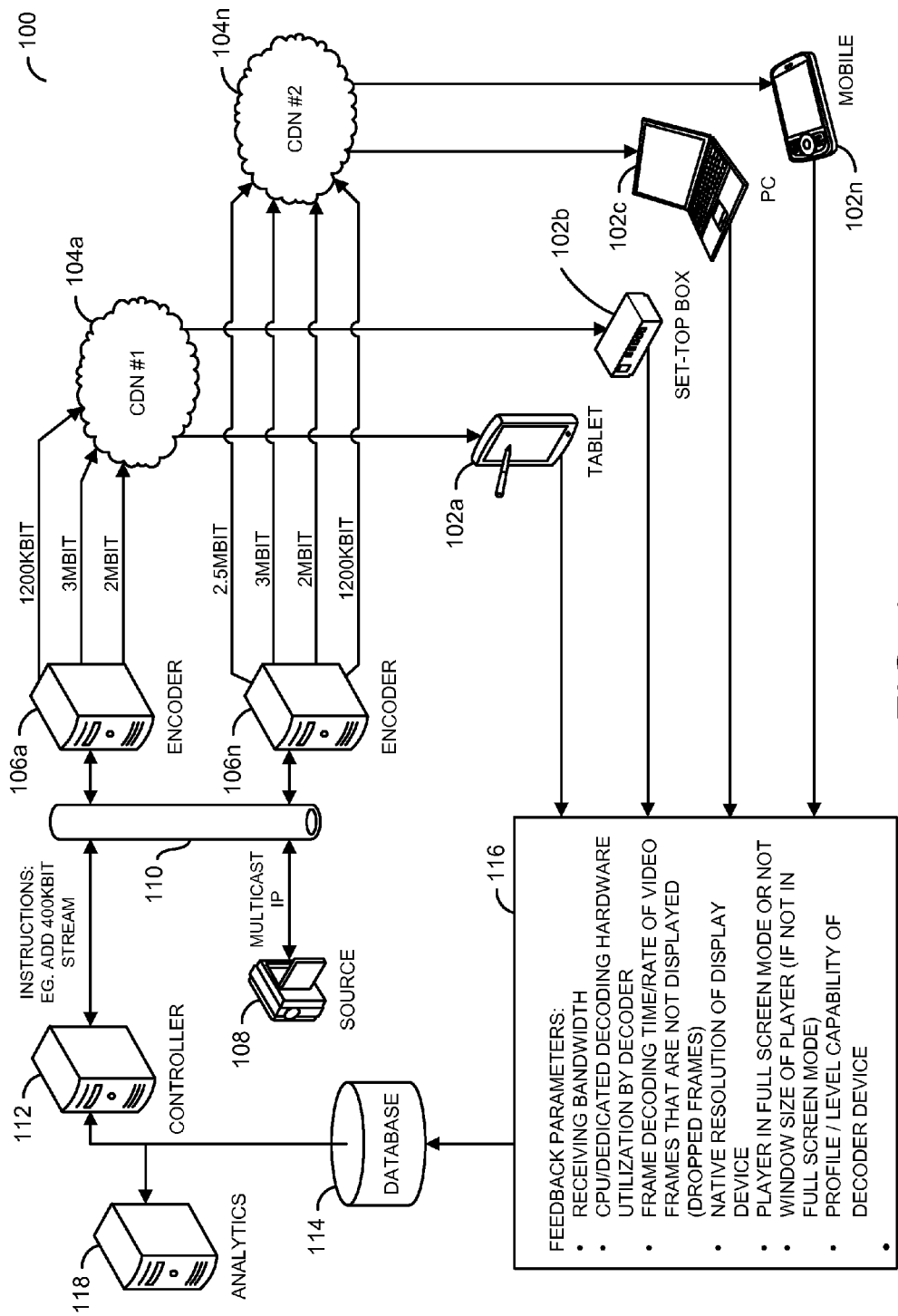
FIG. 1 is a diagram illustrating an example system in accordance with an embodiment of the present invention.

Referring to FIG. 1, a diagram of a system 100 is shown illustrating a content distribution system in accordance with an embodiment of the present invention. The system 100 may comprise, in one example, a number of client devices 102a-102n, a number of content distribution networks (CDNs)/mobile carriers (MCs) 104a-104n, a plurality of encoders 106a-106n, a content source 108, a content provider network 110, and a controller 112. In one example, player applications may reside on, a number of client devices 102a-102n. The client devices 102a-102n may include computers, set-top boxes, cellular telephones, tablets, and other mobile devices. The client devices 102a-102n may be configured to receive content (e.g., video, audio, audio-video, etc.) from the CDNs/MCs 104a-104n. The client devices 102a-102n may be connected to the CDNs/MCs 104a-104n using wired (e.g., cable), wireless (e.g., Wi-Fi, satellite, etc.), third generation (3G), and/or fourth generation (4G) links. Communication between the client devices 102a-102n and the CDNs/MCs may be handled by protocols including, but not limited to, HTTP and/or RTMP. Streaming technologies such as Pantos from Apple, Inc. or Smooth Streaming from Microsoft Corp. may be used. The CDNs/MCs 104a-104n generally make a plurality of streams available to the client devices 102a-102n. The client devices 102a-102n generally select one of the plurality of available streams based on particular capabilities of the client device. The plurality of streams are generally created by the plurality of encoders 106a-106n. For example, the encoders 106a-106n may encode content received from the source (or content provider) 108 via multicast IP on the content provider network 110. However, the content could also be raw video on SDI, files over FTP, etc. Parameters used by the encoders 106a-106n in encoding the plurality of streams are generally managed/adjusted by the controller 112 (e.g., via the network 110).

The controller 112 may be configured to optimize system parameters based upon one or more factors, including, but not limited to, maximum quality for the current audience (e.g., highest bitrates at optimal resolutions with smoothest playback), maximum audience size for a given bandwidth allocation or CDN/MC cost, and minimum set of streams for a given audience. Content Delivery Networks (CDNs) and mobile carriers (MC) typically charge customers for the amount of data sent to users. The controller 112 may choose to lower bitrates of some of the streams generated by the encoders 106a-106n to reduce CDN/MC costs. The controller 112 may be configured to limit the decrease in bitrates to only those levels where viewers will not stop watching due to poor quality. If encoding capacity (for live) or stream variant storage (for VOD) is a limiting factor, the system 100 may be configured to adjust the number of streams being created to serve the largest portion of the audience. In a multi-channel environment, adjusting the number of streams may ensure that a limited set of encoding hardware may serve as many channels as possible, while giving the best quality to the most-watched or highest revenue channels.

In one example, the encoding parameters adjusted by the controller 112 (e.g., to better fit the current audience) may include, but are not limited to, one or more of display resolution, bitrate, profile and level, Group Of Picture (GOP) structure, and entropy coding. For example, if most streams are being sent in a display resolution of 1280×720 but most clients have a native resolution of 960×640, the controller 112 may determine that several streams should be switched to a 960×640 resolution. In an example involving bitrate, a system may be generating a couple of streams, one stream at 1 Mbit and another at 2 Mbit. If most viewers are currently watching the 1 Mbit stream and have some extra bandwidth, but not enough for 2 Mbit, the system implemented in accordance with an embodiment of the present invention may, for example, move the 1 Mbit stream to 1.5 Mbit and add an 800 Kbit stream to cover all of the users, based on the optimization strategy.

The controller 112 may receive feedback information from one or more of the client devices 102a-102n viewing the live event or VOD asset. The feedback information may be automatically generated (e.g., computer generated) by the client devices 102a-102n. In one example, the controller 112 may communicate with a database 114. The database 114 may compile real time player metrics 116 from the client devices 102a-102n for all current viewers. In one example, the metrics (or feedback parameters) may include, but are not limited to, receiving bandwidth, CPU/dedicated decoding hardware utilization by decoder application, frame decoding time/rate of video frames that are not displayed (e.g., dropped frames), native resolution of a respective display device, whether player is in full screen mode or not, window size of player (if not in full screen mode), and profile/level capability of decoder device. In another example, an optional analysis system 118 may be connected to the controller 112. The analysis system 118 may be configured, in one example, to apply heuristics to compute a more optimized set of encoding parameters for the current audience. The controller 112 may signal the encoding device(s) 106a-106n to change the set of streams being produced, based upon the information from the client devices 102a-102n and/or the optional analysis system 118, to provide an optimized viewing experience. A new client manifest may be sent to the player(s) 102a-102n, so that the player(s) 102a-102n may choose to utilize a new stream when appropriate.

Figure 2:
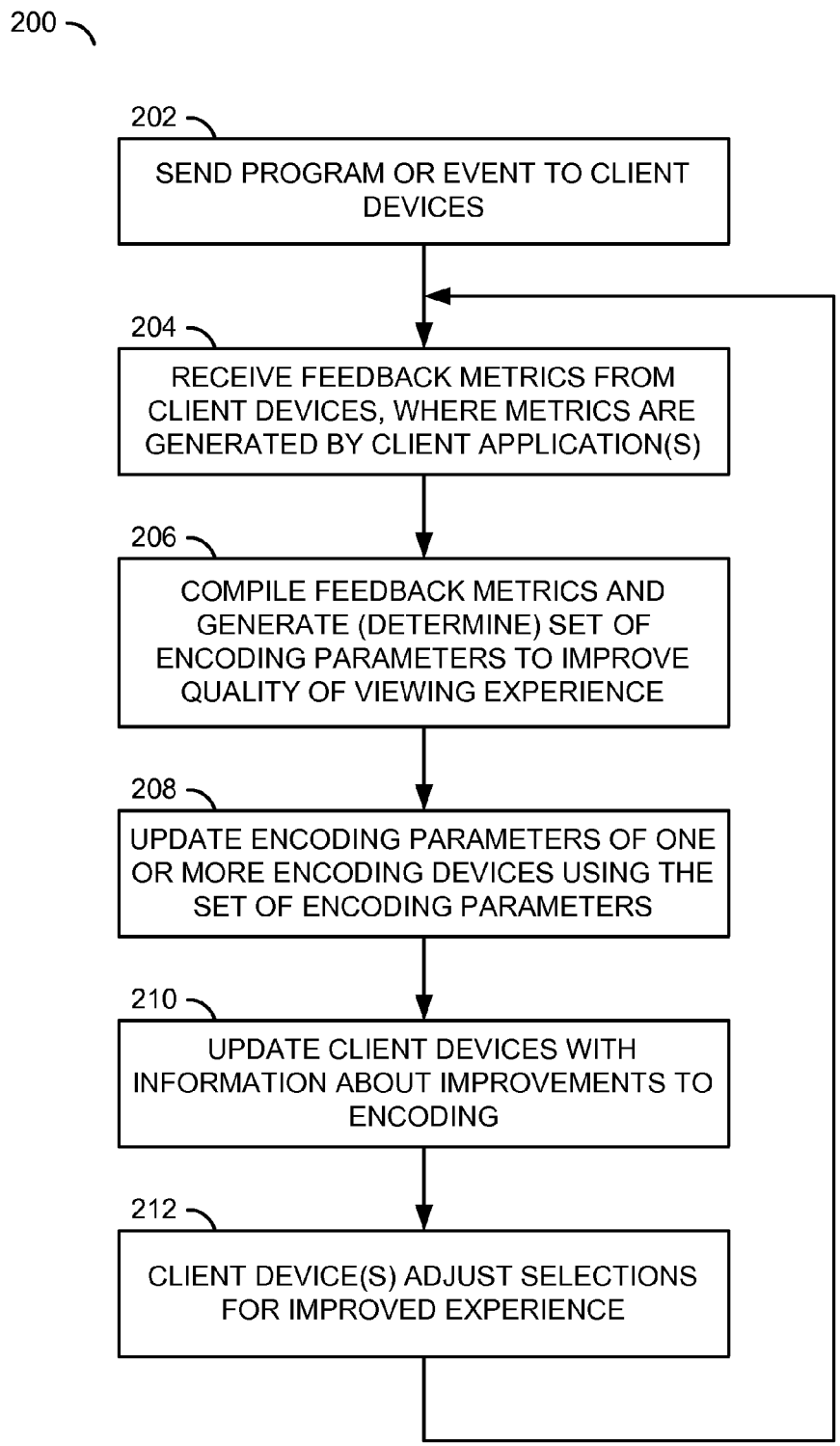
FIG. 2 is a flow diagram illustrating an example system level process using client feedback to optimize encoding.

Referring to FIG. 2, a flow diagram is shown illustrating a process 200 in accordance with an embodiment of the present invention. In one example, the process (or method) 200 may comprise a step (or state) 202, a step (or state) 204, a step (or state) 206, a step (or state) 208, a step (or state) 210, and a step (or state) 212. In the step 202, the process 200 may send content (e.g., live event presentation, video on demand program, etc.) to a number of client devices. In the step 204, the process 200 may generate a number of metrics in the client devices and send the metrics as feedback. In the step 206, the process 200 may compile the feedback from the client devices and determine a set of encoding parameters that would improve a quality level of an experience had by users of the client devices. In the step 208, the process 200 may use the set of encoding parameters determined in the step 206 to update parameters of one or more encoding devices generating the content sent to the client devices. In the step 210, the process 200 may inform client devices (e.g., by sending a new client manifest) about the changes (improvements) made to the available content. In the step 212, the process 200 may adjust selections made by the client devices to improve the user experience. The steps 204 through 212 may be repeated as a continuous process during the program or event presentation.

Figure 3:
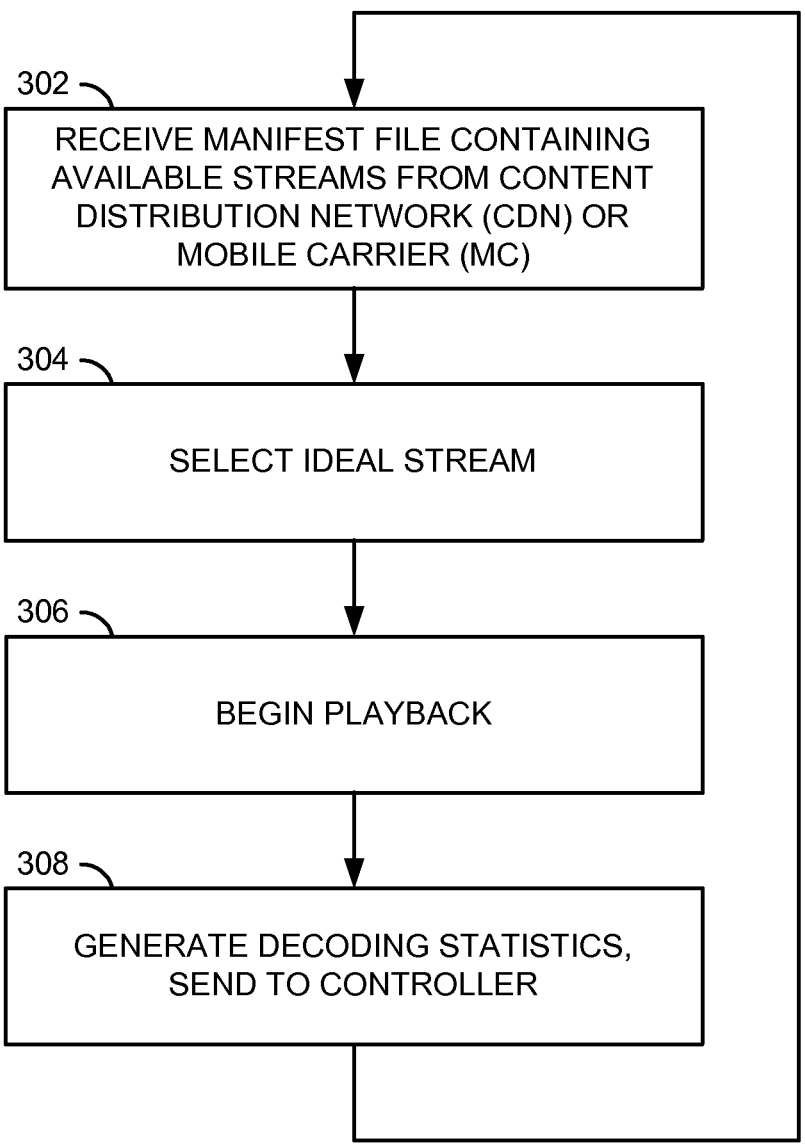
FIG. 3 is a flow diagram illustrating an example client level process for generating the feedback used in the system level process of FIG. 2.

Referring to FIG. 3, a flow diagram is shown illustrating a process 300 in accordance with an embodiment of the present invention. The process (or method) 300 may be implemented on a client device. In one example, the process 300 may comprise a step (or state) 302, a step (or state) 304, a step (or state) 306, and a step (or state) 308. In the step 302, the process 300 may receive a manifest file containing information about a plurality of streams available from a content distribution network (or mobile carrier). In the step 304, the process 300 may select one of the streams. In the step 306, the process 300 may begin playback of the selected stream. In the step 308, the process 300 may generate a set of decoding statistics while decoding the selected stream for playback. The decoding statistics may be sent as feedback to a system providing the content to the content distribution network (or mobile carrier). The process 300 may return to the step 302 and repeat with an updated manifest file comprising information regarding changes made to the streams available.

A system in accordance with an embodiment of the present invention may include a decoding application (or player) that monitors several metrics about the receiving and decoding of a received stream. In one example, the metrics may include, but are not limited to, receiving bandwidth, CPU/dedicated decoding hardware utilization by decoder application, frame decoding time/rate of video frames that are not displayed (e.g., dropped frames), native resolution of a respective display device, whether player is in full screen mode or not, window size of player (if not in full screen mode), and profile/level capability of decoder device. The player applications may reside on, for example, all video decoding devices, including, but not limited to computers, set-top boxes, cellular telephones, and mobile devices (e.g., laptops, tablets, smart phones, etc.). The player applications may reside on so called wireless (e.g., Wi-Fi) device, third generation (3G) and/or fourth generation (4G) mobile devices, and/or wired devices.

A system implemented in accordance with an example embodiment of the present invention may also include an encoder control device (or controller). The controller may receive information from one or more players viewing a live event or VOD asset. In one example, the controller may compile real time player metrics for all current viewers and apply, in one example, heuristics to compute a more optimized set of encoding parameters for the current audience. The controller may then signal the encoding device(s) to change the set of streams being produced to provide an optimized viewing experience. A new client manifest may be sent to the player(s), so that the player(s) may choose to utilize a new stream when appropriate.

For many video codecs, decoders are capable of playing back streams at specified profiles and levels. If many devices in the current audience cannot decode the current streams (even if they have the bandwidth to do so), the controller may use the feedback information to add streams at the appropriate profile and level. With respect to GOP structure, most video codecs involved in adaptive bitrate streaming order video frames with a GOP structure of frame types. Certain parameters (e.g., the number of B-frames) may add quality at the expense of decoding computational power. If too many players cannot decode the frames in real-time, the controller may adjust the values for smoother video. Some codecs (e.g., H.264) may use multiple entropy coding modes to increase compression efficiency at the expense of decoding computational power. The controller may adjust the entropy coding mode if too many players cannot decode the streams in real-time.

The present invention generally provides many advantages in both live streaming and VOD. For live streaming, the system implemented in accordance with an embodiment of the present invention may be used to maintain the largest audience for higher advertising revenue, while controlling CDN/MC costs to maximize profit. A system implemented in accordance with an embodiment of the present invention may also be used to optimize the number of channels that may be effectively delivered over a fixed amount of bandwidth. For VOD content, a system implemented in accordance with an embodiment of the present invention may store a high-quality master copy of a video and create several adaptive streams based on the master copy. Over time the controller may create more optimized streams and delete un-used streams to optimize storage space. New devices (e.g., mobile phones with new resolutions and/or decode capabilities) may be automatically supported. The content owner may optimize the VOD streams over time to support the most popular player devices.

While the invention has been particularly shown and described with reference to the preferred embodiments thereof, it will be understood by those skilled in the art that various changes in form and details may be made without departing from the scope of the invention.

What is claimed is:

1. A system for managing delivery of audio-video content comprising:
   a controller configured to control generation of a plurality of streams containing said audio-video content;
   one or more client devices configured to select a stream from said plurality of streams, receive and decode the selected stream, generate real time player metrics about receiving and decoding the selected stream, and send the real time player metrics to the controller as feedback; and
   a database coupled between said controller and said one or more client devices, said database configured to compile the real time player metrics received from said one or more client devices for all current viewers and present the compiled real time player metrics as said feedback to said controller, wherein said controller adjusts generation of said streams based on the compiled real time player metrics.

2. The system according to claim 1, further comprising one or more encoders configured to generate said plurality of streams, wherein said controller is configured to adjust encoding parameters of said one or more encoders based upon said feedback.

3. The system according to claim 2, wherein said controller is configured to adjust said encoding parameters in order to obtain at least one of maximum quality for a current audience, maximum audience size for a given bandwidth allocation, maximum audience size for a given delivery cost, and minimum number of streams for a given audience.

4. The system according to claim 2, wherein said encoding parameters comprise at least one of display resolution, bitrate, profile and level, group of picture structure, and entropy coding.

5. The system according to claim 1, wherein said real time player metrics comprise at least one of receiving bandwidth, CPU utilization by decoder application, dedicated decoding hardware utilization by decoder application, frame decoding time, rate of video frames that are not displayed, dropped frames, native resolution of a respective display of each client device, whether each client device is in full screen mode or not, window size of each client device, profile capability of a decoder of each client device, and level capability of a decoder of each client device.

6. The system according to claim 1, wherein said content comprises a live event presentation.

7. The system according to claim 1, wherein said content comprises video on demand.

8. The system according to claim 1, wherein said one or more client devices comprise one or more of a personal computing device, a set-top box, a mobile device, a cellular telephone, and a tablet.

9. The system according to claim 1, wherein:
   said controller applies heuristics to said compiled real time player metrics to compute a more optimized set of encoding parameters for a current audience.

10. The system according to claim 1, further comprising:
    an analysis system connected to said controller and configured to apply heuristics to said compiled real time player metrics to compute a more optimized set of encoding parameters for a current audience.

11. The system according to claim 1, wherein said controller is further configured to detect client devices unable to decode the plurality of streams based upon the compiled real time player metrics and utilize the compiled real time player metrics to add streams.

12. A method of providing content to a consumer comprising the steps of:
    receiving a manifest file containing information about a plurality of available content streams;
    selecting one of said plurality of available content streams based upon said information in said manifest file and one or more characteristics of a client device; and
    generating real time player metrics about receiving and decoding the selected content stream and sending the real time player metrics to a database, wherein said database is configured to compile the real time player metrics received from client devices for all current viewers and send the compiled real time player metrics as feedback to a controller remotely located from said client devices.

13. The method according to claim 12, further comprising:
    controlling generation of said plurality of available content streams based upon said feedback regarding the real time player metrics about said client devices receiving and decoding said plurality of available content streams.

14. The method according to claim 13, wherein controlling generation of said plurality of available content streams comprises adjusting encoding parameters of one or more encoders configured to generate said plurality of available content streams, wherein said encoding parameters of said one or more encoders are adjusted based upon said feedback.

15. The method according to claim 14, wherein said encoding parameters are adjusted to obtain at least one of maximum quality for a current audience, maximum audience size for a given bandwidth allocation, maximum audience size for a given delivery cost, and minimum number of streams for a given audience.

16. The method according to claim 14, wherein said encoding parameters comprise at least one of display resolution, bitrate, profile and level, group of picture structure, and entropy coding.

17. The method according to claim 12, wherein said real time player metrics comprise at least one of receiving bandwidth, CPU utilization by decoder application, dedicated decoding hardware utilization by decoder application, frame decoding time, rate of video frames that are not displayed, dropped frames, native resolution of a respective display of each client device, whether each client device is in full screen mode or not, window size of each client device, profile capability of a decoder of each client device, and level capability of a decoder of each client device.

18. The method according to claim 12, wherein said content comprises a live event presentation.

19. The method according to claim 12, wherein said content comprises video on demand.

20. The method according to claim 12, further comprising: sending an updated manifest file to said client devices.

\* \* \* \* \*